US009220251B2

(12) United States Patent
Davis

(10) Patent No.: US 9,220,251 B2
(45) Date of Patent: Dec. 29, 2015

(54) FISHING ROD HOLDER ASSEMBLY

(71) Applicant: Danny Lee Davis, Ringgold, VA (US)

(72) Inventor: Danny Lee Davis, Ringgold, VA (US)

(*) Notice: Subject to any disclaimer, the term of this patent is extended or adjusted under 35 U.S.C. 154(b) by 132 days.

(21) Appl. No.: 13/911,664

(22) Filed: Jun. 6, 2013

(65) Prior Publication Data

US 2013/0326929 A1    Dec. 12, 2013

Related U.S. Application Data

(60) Provisional application No. 61/656,114, filed on Jun. 6, 2012.

(51) Int. Cl.
*A01K 97/10* (2006.01)

(52) U.S. Cl.
CPC ........................................ *A01K 97/10* (2013.01)

(58) Field of Classification Search
USPC .................................. 43/21.2; 248/538, 539
See application file for complete search history.

(56) References Cited

U.S. PATENT DOCUMENTS

| 3,564,753 | A | * | 2/1971 | Fravel | 43/21.2 |
| 4,161,839 | A | * | 7/1979 | Ward | 43/17 |
| 4,697,775 | A | * | 10/1987 | Wille | 248/231.41 |
| 4,852,291 | A | * | 8/1989 | Mengo | 43/21.2 |
| 5,871,196 | A | | 2/1999 | Martelli | |
| 6,591,541 | B1 | * | 7/2003 | Cummings | 43/21.2 |
| 7,232,099 | B1 | * | 6/2007 | Wilcox | 248/228.1 |
| 8,453,373 | B2 | * | 6/2013 | Gordon | 43/21.2 |
| 2010/0299988 | A1 | * | 12/2010 | Robinson | 43/21.2 |
| 2012/0017487 | A1 | * | 1/2012 | O'Keefe | 43/21.2 |
| 2013/0019515 | A1 | * | 1/2013 | Holzer | 43/21.2 |

* cited by examiner

*Primary Examiner* — Christopher P Ellis
(74) *Attorney, Agent, or Firm* — Ashley Law Firm P.C.; Stephen S. Ashley, Jr.

(57) ABSTRACT

A fishing rod holder assembly includes a holding member for receiving and holding a fishing rod, and a support member comprising a substantially flat mounting section for positioning on a surface, and a supporting section angled in relation to the mounting section. A receiving member is rotatably connected to the supporting section and has a first opening formed therein for receiving and engaging the holding member, such that the holding member can be positioned at a desired angle relative to the surface by rotating the receiving member.

19 Claims, 19 Drawing Sheets

FISHING ROD HOLDER ASSEMBLY

CROSS-REFERENCES TO RELATED APPLICATIONS

This application claims priority to U.S. Provisional Application No. 61/656,114, filed Jun. 6, 2012, which is incorporated herein by reference.

TECHNICAL FIELD AND BACKGROUND OF THE INVENTION

The present invention relates to an assembly for mounting on a support structure and holding an item, such as a fishing rod. An embodiment of the invention comprises an assembly for holding a fishing rod that can be mounted on a boat or similar structure, and allows for multi-directional movement of the fishing rod.

Fishing rod holders are known in the art. Such holders can typically be mounted on a boat, pier or other similar structure, and holds the rod in a desired position so the user does not have to continuously hold the rod in his hands while the line is cast in the water. As such, the user's hands are free, and he can move about on the boat or pier and do other things until he sees a fish is biting on the line. Such holders also enable a single user to fish with multiple fishing rods simultaneously.

The position of the fishing rod is often an important factor in fishing, and the desired position of the rod can vary depending on the preference of the user and the type of fishing being employed by the user. As such, it is common for a fisherman to want to alter the direction and angle of the fishing rod relative to the water.

SUMMARY OF THE INVENTION

Therefore, one object of the present invention is to provide a fishing rod holder assembly that can be mounted to boats, piers and other similar structures used in fishing. Another object of the invention is to provide a fishing rod assembly that allows for vertical and horizontal adjustment of the fishing rod. These and other objects of the invention can be achieved in the preferred embodiments of the invention described below.

One embodiment of the invention comprises an apparatus for mounting a fishing rod holder thereon, comprising a support member comprising a substantially flat mounting section for positioning on a surface, and a supporting section angled in relation to the mounting section. A receiving member is rotatably connected to the supporting section and having a first opening formed therein adapted for receiving and engaging a base end of the fishing rod holder, so that the fishing rod holder can be positioned at a desired angle relative to the surface by rotating the receiving member.

According to another embodiment of the invention, at least one opening is formed in the mounting section for receiving a fastening member there through.

According to another embodiment of the invention, the supporting section is angled at about ninety degrees relative to the mounting section.

According to another embodiment of the invention, the inner surface of the first opening has threads formed thereon for engaging complimentary threads formed on the base end of the fishing rod holder.

According to another embodiment of the invention, a second opening is formed in the receiving member, a complimentary third opening is formed in the supporting section, and a fastening member is positioned through the second and third openings.

According to another embodiment of the invention, the third opening can be a through hole, an inner surface of the second opening has threads formed thereon, and the fastening member can be a bolt having threads thereon complimentary to the threaded inner surface of the second opening to frictionally engage the threaded inner surface of the second opening, such that rotating the bolt in a first direction tightens the receiving member against the supporting section, and rotating the bolt in a second direction opposite to the first direction releases the receiving member from the supporting section, thereby allowing the receiving member to rotate about the bolt.

According to another embodiment of the invention, the receiving member can be selectively moved to one of a plurality of positions by rotating the bolt in the second direction to release the receiving member from the supporting section, rotating the receiving member about the bolt to a desired position, and tightening the bolt when the receiving member is at the desired position.

According to another embodiment of the invention, the threads on the inner surface of the second opening can be female threads, and the threads on the bolt can be male threads.

According to another embodiment of the invention, the receiving member can be elongate, and the first opening is positioned at a substantially perpendicular orientation relative to the second opening.

According to another embodiment of the invention, the receiving member has a substantially cuboid shape. The first opening can be formed in a lateral side of the receiving member, and the second opening can be formed in a longitudinal side.

According to another embodiment of the invention, a fishing rod holder assembly comprises a holding member for receiving and holding a fishing, and a base. The base comprises a support member comprising a substantially flat mounting section for positioning on a surface, and a supporting section angled in relation to the mounting section. A receiving member is rotatably connected to the supporting section and has a first opening formed therein for receiving and engaging the holding member, whereby the holding member can be positioned at a desired angle relative to the surface by rotating the receiving member.

According to another embodiment of the invention, a plurality of openings are formed in the mounting section for receiving fastening members there through.

According to another embodiment of the invention, the supporting section is substantially L-shaped.

According to another embodiment of the invention, the holding member has a base end and threads formed on the outer surface of the base end. The inner surface of the first opening in the receiving member has complimentary threads thereon for engaging the threads on the holding member base end, so that the holding member is releasably connected to the receiving member.

According to another embodiment of the invention, a nut can be positioned on the threaded base end of the holding member for selectively tightening engagement of the holding member in the first opening of the receiving member, such that the holding member can be horizontally adjusted by rotating the base end the holding member within the opening to a desired position, and tightening the nut on the threaded base end.

According to another embodiment of the invention, the holding member comprises a cradle section for receiving and holding the fishing rod, and a stem section connected to the cradle section. The stem section has a threaded base end base, and the inner surface of the first opening in the receiving member has complimentary threads thereon for engaging the threads on the holding member base end, such that the holding member is releasably connected to the receiving member.

According to another embodiment of the invention, a second opening is formed in the receiving member, a complimentary third opening is formed in the supporting section, and a fastening member positioned through the second and third openings.

According to another embodiment of the invention, the third opening can be a through hole, an inner surface of the second opening has threads formed thereon, and the fastening member can be a bolt having threads thereon complimentary to the threaded inner surface of the second opening to frictionally engage the threaded inner surface of the second opening, such that rotating the bolt in a first direction tightens the receiving member against the supporting section, and rotating the bolt in a second direction opposite to the first direction releases the receiving member from the supporting section, thereby allowing the receiving member to rotate about the bolt.

According to another embodiment of the invention, the holding member can be selectively moved to one of a plurality of positions by rotating the bolt in the second direction to release the receiving member from the supporting section, rotating the receiving member about the bolt to a desired position, and tightening the bolt when the receiving member is at the desired position.

According to another embodiment of the invention, the receiving member has a substantially cuboid shape, the first opening is formed in a lateral side of the receiving member, and the second opening is formed in a longitudinal side.

DESCRIPTION OF THE PREFERRED EMBODIMENTS OF THE INVENTION AND BEST MODE

Figure 1:
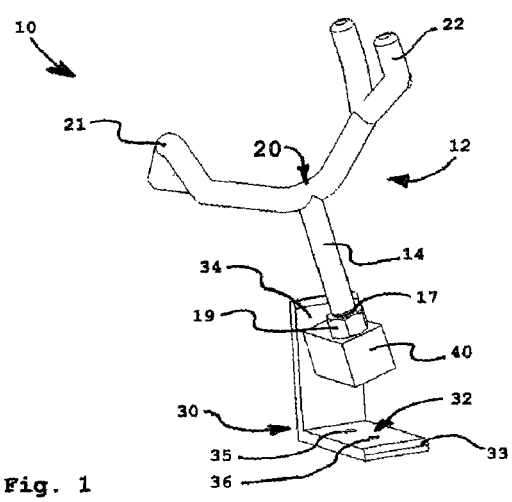
FIG. 1 is a perspective view of a fishing rod holder assembly according to a preferred embodiment of the invention.

A fishing rod holder assembly according to a preferred embodiment of the invention is illustrated in FIGS. 1-10, and shown generally at reference numeral 10. The fishing rod holder assembly 10 comprises a holding member 12 for receiving and holding an item such as fishing rod, and a base 30 for supporting the holder 12 and mounting on a support structure, such as a portion of the sidewall of a boat.

Figure 10:
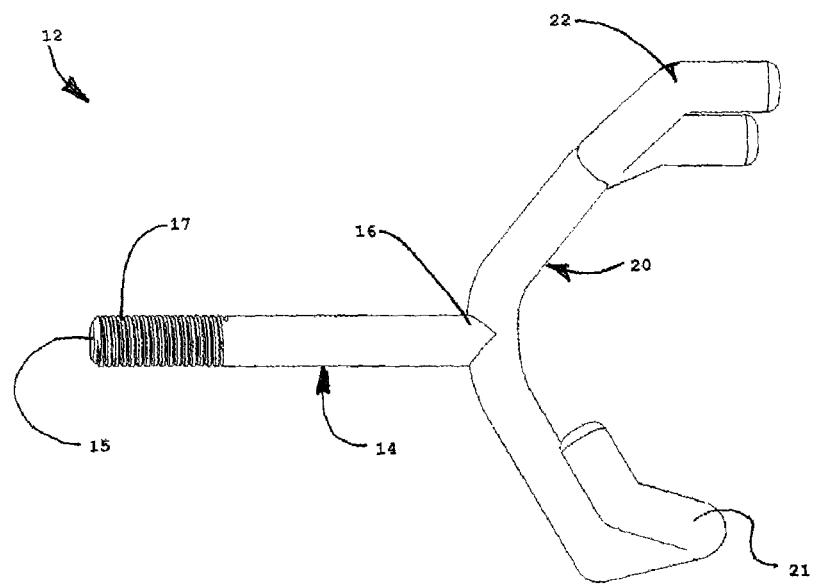
FIG. 10 is a side view of the holding member of the assembly of FIG. 1.
Figure 18:
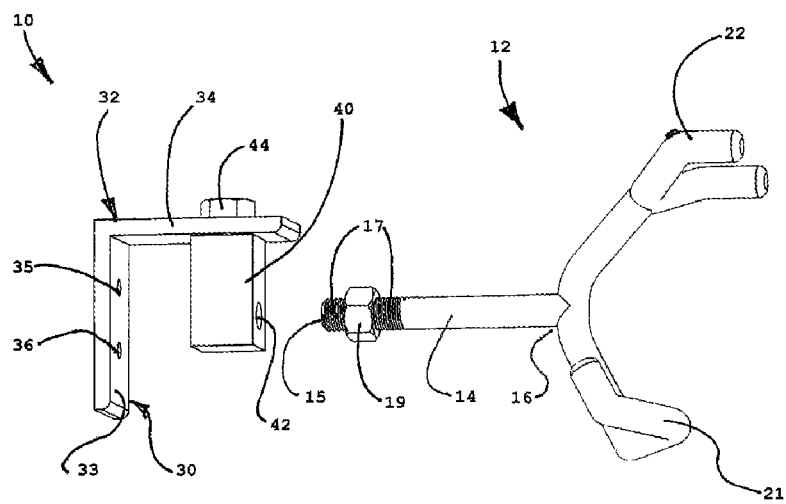
FIG. 18 is a schematic perspective view of the assembly of FIG. 1.

As shown in FIGS. 1, 10 and 18, the holding member 12 comprises a stem section 14 having a base end 15, and an upper end 16. A section of male threading 17 is formed at the base end 15 of the stem 14. The upper end 16 of the stem connects to a cradle section 20 for receiving and supporting an item such as a fishing rod. The cradle section 20 includes a first receiving portion 21 having a substantially upside down U-shape, and a second receiving portion 22 having a substantially U-shape. The holding member can be made of aluminum, steel or other suitable material.

Figure 2:
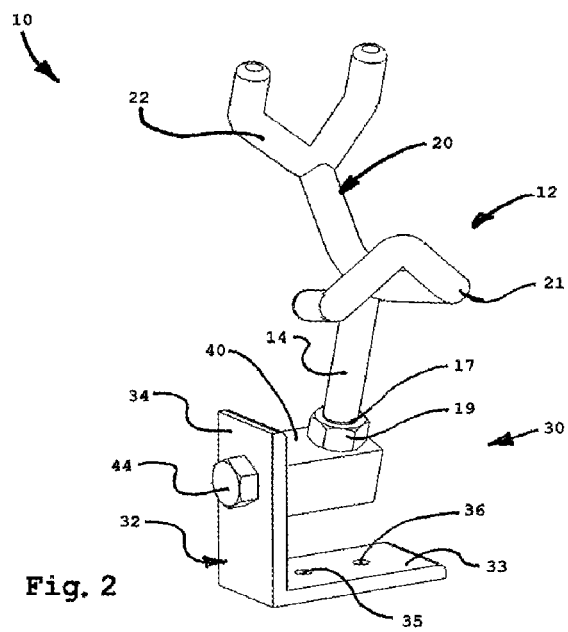
FIG. 2 is another perspective view of the fishing rod holder assembly of FIG. 1.
Figure 3:
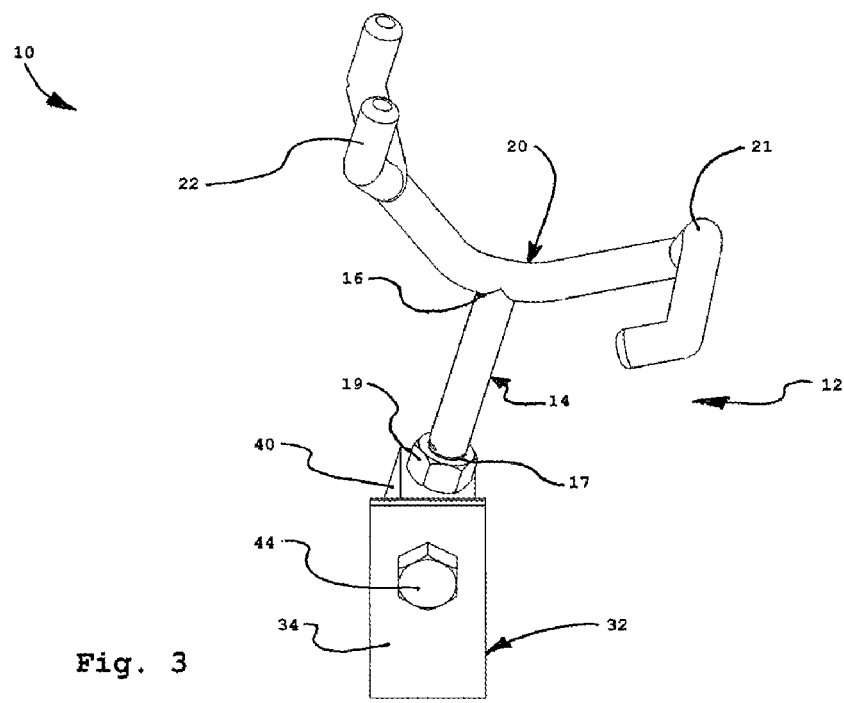
FIG. 3 is another perspective view of the assembly of FIG. 1.
Figure 4:
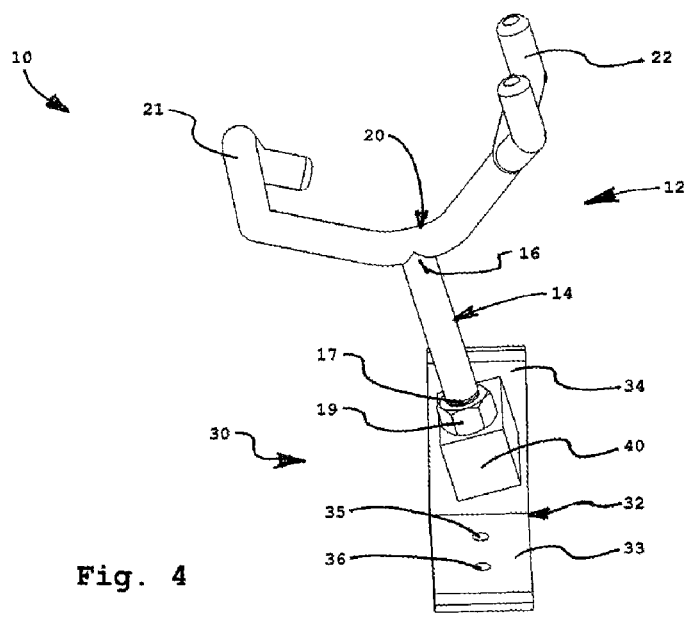
FIG. 4 is another perspective view of the assembly of FIG. 1.
Figure 5:
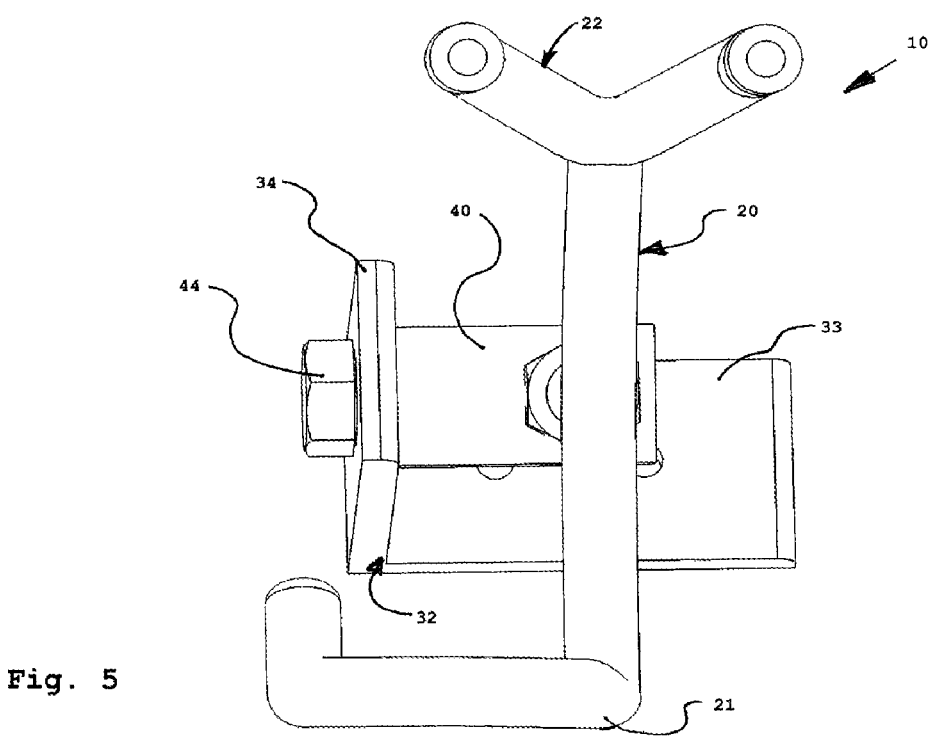
FIG. 5 is a top plan view of the assembly of FIG. 1.
Figure 6:
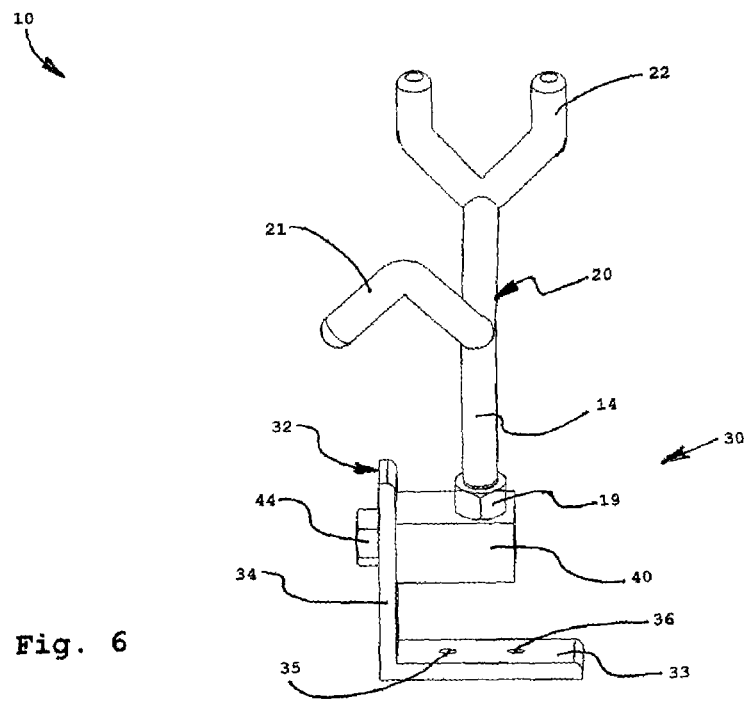
FIG. 6 is another perspective view of the assembly of FIG. 1.
Figure 7:
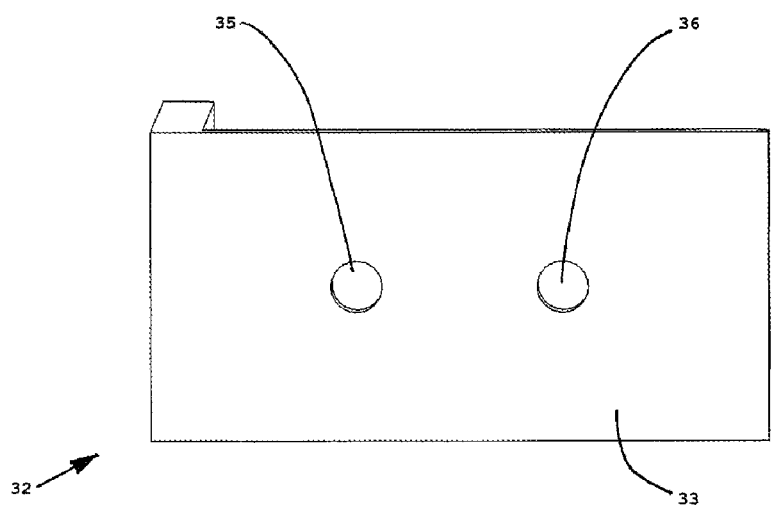
FIG. 7 is a partial bottom plan view of the base of the assembly of FIG. 1.
Figure 8:
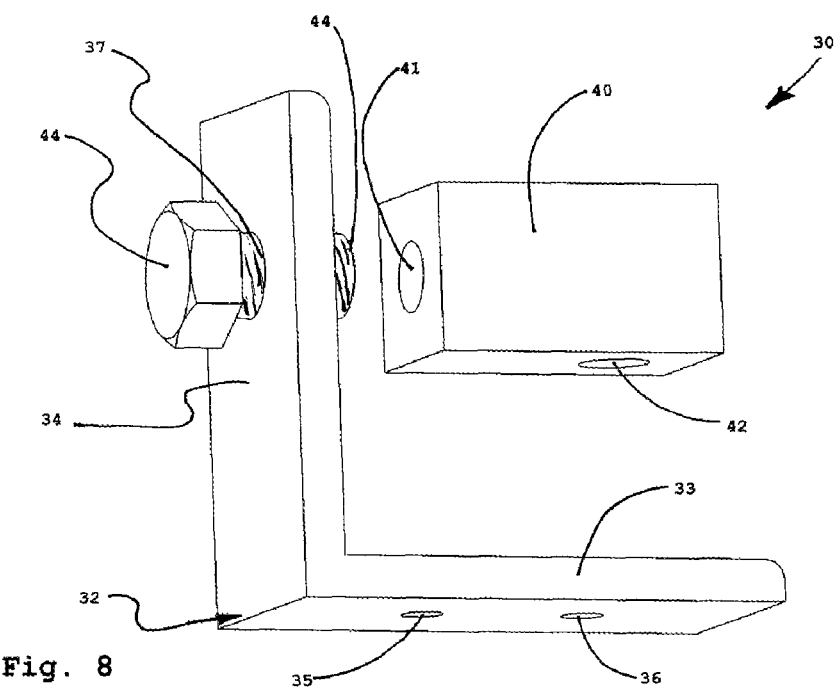
FIG. 8 is a schematic perspective view of the base of the assembly of FIG. 1.
Figure 17:
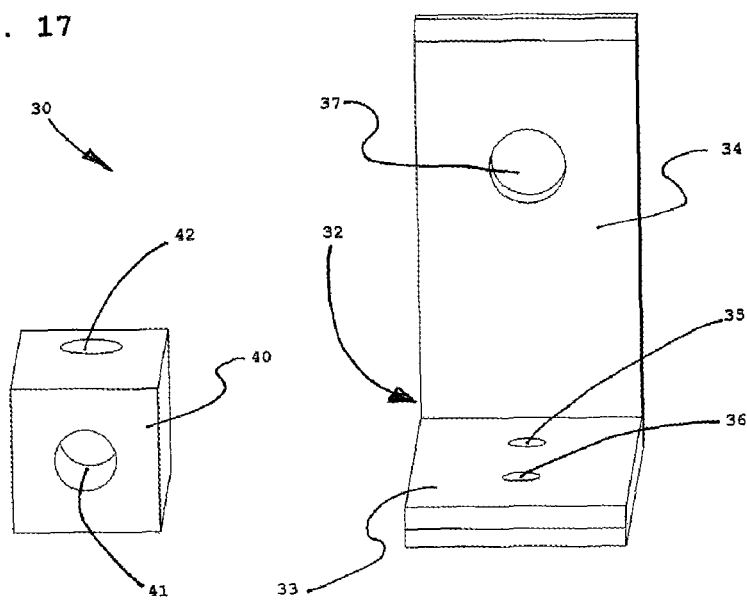
FIG. 17 is a perspective view of components of the base of the assembly of FIG. 1.

As shown in FIGS. 2 and 8, the base 30 comprises a substantially L-shaped support member 32 comprised of a mounting section 33, and a supporting section 34 extending from the mounting section 33 in substantially perpendicular position to the mounting section 33. As shown in FIGS. 1, 7 and 8, two through holes 35, 36 are formed in the mounting section 33, and a relatively larger through hole 37, shown in FIGS. 8 and 17, is formed in the supporting section 34. The L-shaped member 32 can be made of aluminum, steel or other suitable material.

Figure 9:
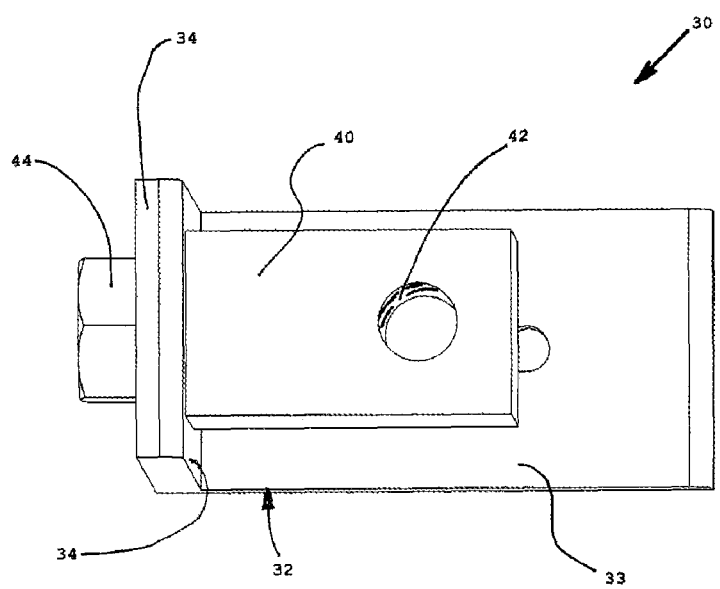
FIG. 9 is a top plan view of the base of the assembly of FIG. 1.

The base 30 includes an elongate receiving member 40 having a first opening 41 formed in a longitudinal end of the receiving member 40, shown in FIGS. 8 and 17, and. The inner surface of the first opening 41 has female threading to receive and engage a male threaded bolt 44 positioned through hole 37 of the L-shaped member 32, as shown in FIGS. 8 and 9. The bolt can be made of stainless steel or other suitable material. The inner surface of the second opening 42 has female threading to receive and engage the male threading 17 of the stem 14 of the holding member 12, as shown in FIGS. 1-4 and 18. A fastening member such as a nut 19 can be used to tighten the engagement of the stem 14 of the holder 12 to the receiving member 40. The receiving member 40 can be made of aluminum, steel or other suitable material.

The assembly 10 preferably has the following dimensions. The mounting section 33 and the supporting section 34 of the L-shaped member 32 each have a preferred length of approximately three inches, a width of approximately 1½ inches, and a thickness of approximately ¼ inch. The nut 19 and the bolt 44 each have a preferred diameter of approximately ¾ inch. The threaded openings 41, 42 each have a preferred diameter of approximately ½ inch. The threaded section 17 of the stem 15 preferably has a diameter of ½ inch. The receiving member 40 is preferably a rectangular aluminum block having dimensions of approximately one inch wide, one inch high, and 1¾ inches long.

Alternatively, a relatively smaller version of the assembly 10 can have the following preferred dimensions. The mounting section 33 and the supporting section 34 of the L-shaped member 32 each have a preferred length of approximately three inches, a width of approximately 1¼ inches, and a thickness of approximately ¼ inch. The nut 19 and the bolt 44 each have a preferred diameter of approximately ⅜ inch. The threaded openings 41, 42 each have a preferred diameter of approximately ⅜ inch. The threaded section 17 of the stem 15 preferably has a diameter of ⅜ inch. The receiving member 40 is preferably a rectangular aluminum block having dimensions of approximately ¾ inch wide, ¾ inch high, and 1¾ inches long.

In a method of using the assembly 10 according to a preferred embodiment of the invention, the assembly can be used to hold a fishing rod. The assembly 10 is positioned on a desired area of a boat sidewall, such that the mounting section 33 extends toward the right of the user positioned in the boat. Fastening members such as screws can be positioned through the holes 35, 36 of the mounting section 33 of the base 30 and screwed into the desired area of a boat sidewall, thereby mounting the assembly 10 to the boat. A fishing rod is positioned on the cradle section 20, with the portion of the rod proximate to the user extending through the first receiving portion 21 of the cradle, and the portion of the rod distal to the user positioned on the second receiving portion 22.

Figure 11:
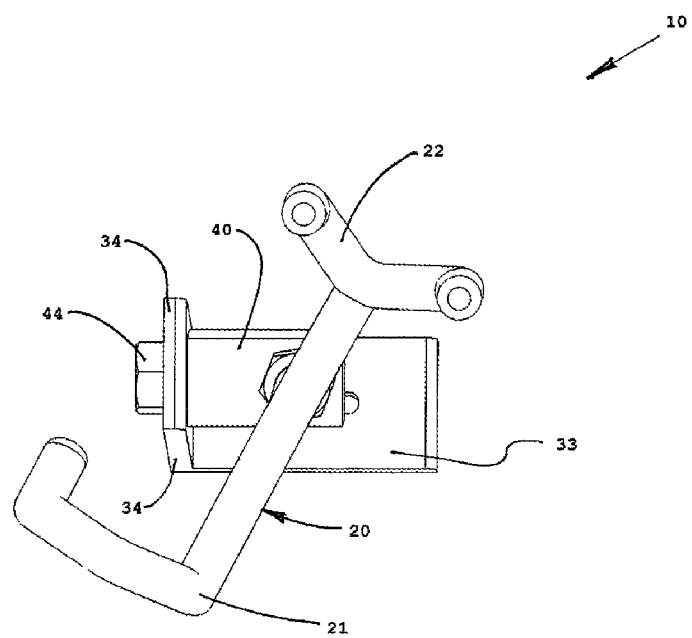
FIG. 11 is another top plan view of the assembly of FIG. 1.
Figure 12:
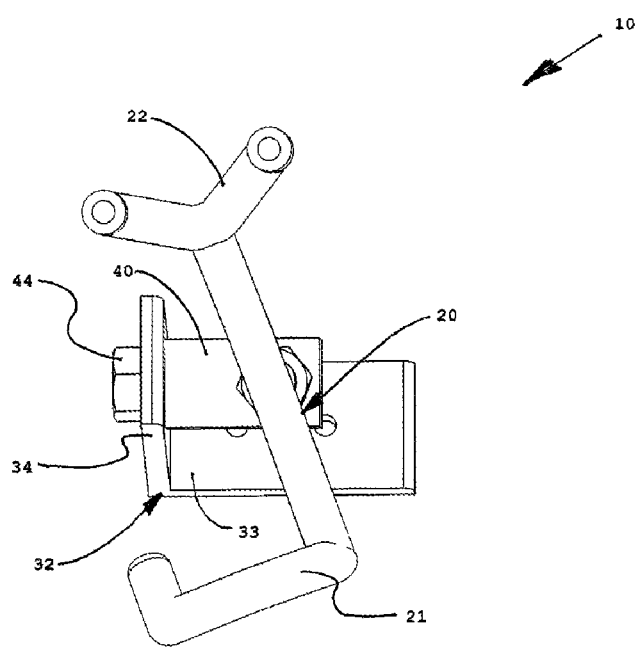
FIG. 12 is another top plan view of the assembly of FIG. 1.

The position of the fishing rod can be adjusted horizontally by turning the base end 15 of the stem 14 of the holding member 12 within the opening 42 to the desired position, and tightening the nut 19 on the threaded section 17 against the receiving member 40. FIGS. 11 and 12 illustrate horizontal adjustment of the holding member 12.

The fishing rod can be positioned at a desired vertical angle by adjusting the vertical angle of the holding member 12 supporting the fishing rod. The vertical angle of the holding member 12 can be adjusted by loosening bolt 44, and pivoting the receiving member 40 about the bolt 44 to a desired position, and then tightening the bolt 44 against supporting section 34. The vertical position of the holding member 12 can be adjusted in a range of approximately 270 degrees, as illustrated in FIGS. 13-16. As such, the holding member 12 can be positioned at a variety of vertical angles, such as that shown in FIG. 15, for when the assembly 10 is holding a fishing rod during fishing operations, and then moved to a storage position, such as that shown in FIG. 16, in which the holding member 12 sits completely within the interior of the boat, such that the assembly 10 does not interfere with a cover being placed over the boat during storage.

Figure 13:
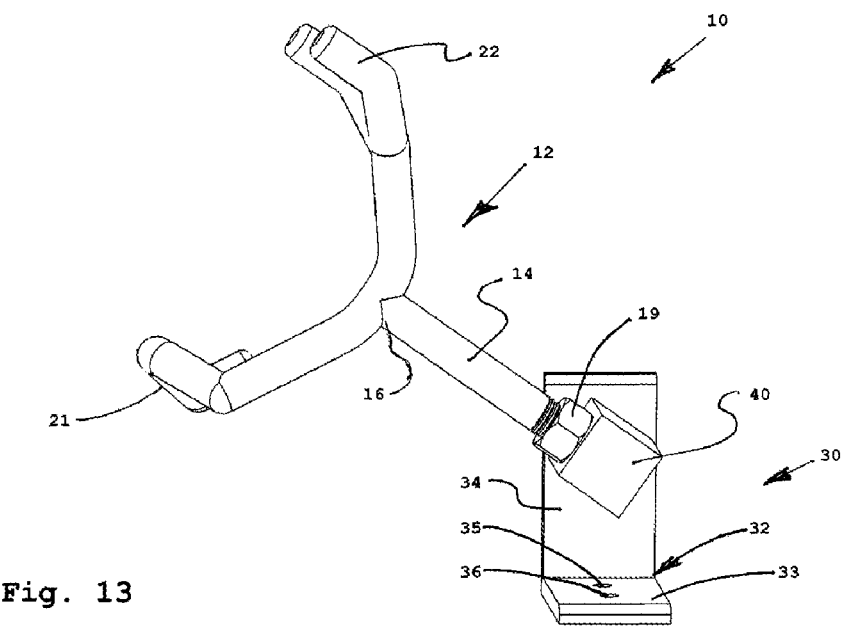
FIG. 13 is a side elevation of the assembly of FIG. 1.
Figure 14:
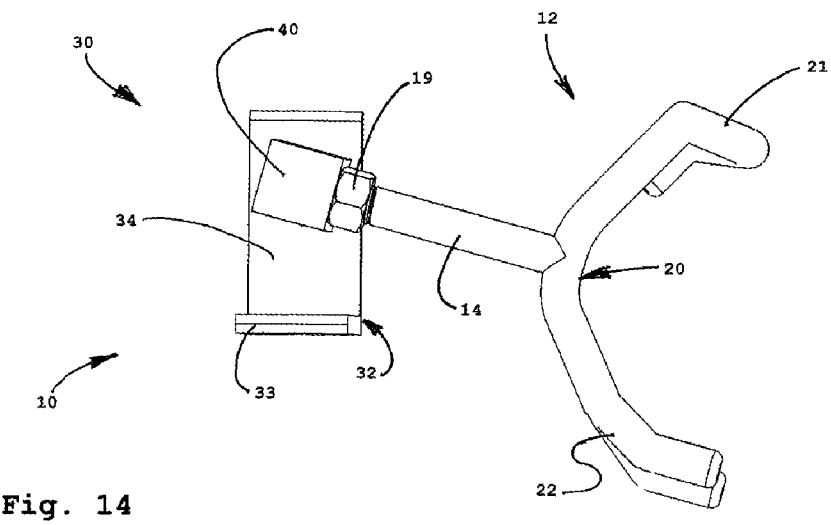
FIG. 14 is another side elevation of the assembly of FIG. 1.
Figure 15:
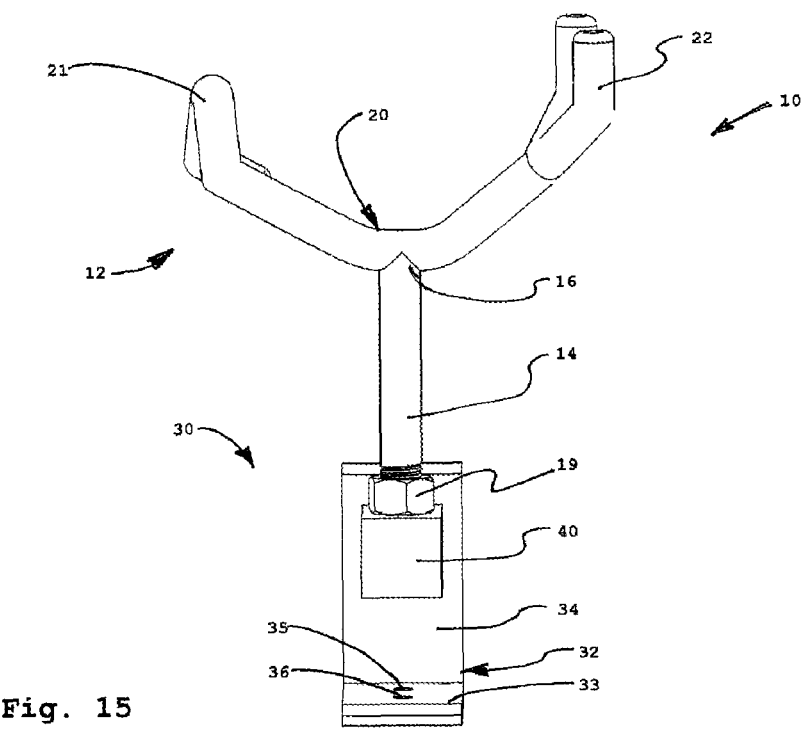
FIG. 15 is another side elevation of the assembly of FIG. 1.
Figure 16:
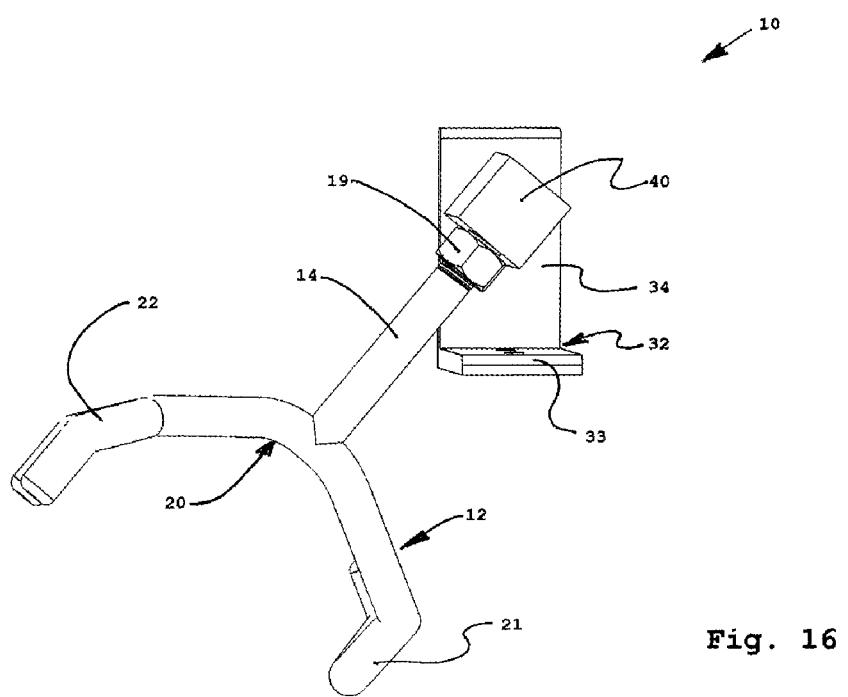
FIG. 16 is another side elevation of the assembly of FIG. 1.

In the views of the assembly shown in FIGS. 13-14, clockwise rotation of the receiving member 40 tightens the engagement against bolt 44. As such, when a fish bites on the fishing rod line, the downward force exerted upon the second receiving portion 22 by the fish pulling on the line causes the receiving member 40 to further tighten against the bolt 44. This helps keep the assembly 10 securely in place even when the user is not present when a fish is biting on the fishing line.

Figure 19:
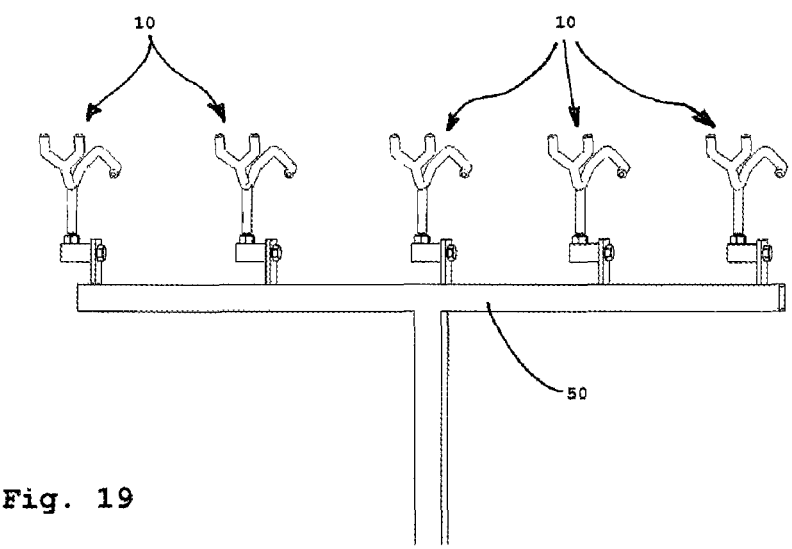
FIG. 19 is a front elevation of a fishing rod holder assembly according to another embodiment of the invention.

An alternative embodiment of the invention is illustrated in FIG. 19. As shown in FIG. 19, a plurality of assemblies 10 can be mounted on a single stand 50.

A fishing rod holder assembly, and a method of using same are described above. Various changes can be made to the invention without departing from its scope. Although preferred embodiments of the invention described above disclose an assembly for holding a fishing rod, the invention is not so limited. The invention can be used to support items other than fishing rods, and can be mounted on structures other than boats. The above description of the preferred embodiments and best mode of the invention are provided for the purpose of illustration only and not limitation—the invention being defined by the following claims and equivalents thereof.

What is claimed is:

1. An apparatus for mounting a fishing rod holder thereon, comprising:
   (a) a support member comprising a substantially flat mounting section for positioning on a surface, and a supporting section angled in relation to the mounting section; and
   (b) a cuboid shaped receiving member rotatably connected to the supporting section and having a first opening formed therein adapted for receiving and engaging a base end of the fishing rod holder, whereby the fishing rod holder can be positioned at a desired angle relative to the surface by rotating the receiving member.

2. The apparatus according to claim 1, wherein the supporting section is angled at about ninety degrees relative to the mounting section.

3. The apparatus according to claim 1, wherein an inner surface of the first opening has threads formed thereon for engaging complimentary threads formed on the base end of the fishing rod holder.

4. The apparatus according to claim 1, wherein a second opening is formed in the receiving member, a complimentary third opening is formed in the supporting section, and further comprising a fastening member positioned through the second and third openings.

5. An apparatus for mounting a fishing rod holder thereon, comprising:
   (a) a support member comprising a substantially flat mounting section for positioning on a surface, and a supporting section angled in relation to the mounting section;
   (b) a receiving member rotatably connected to the supporting section and having a first opening formed therein adapted for receiving and engaging a base end of the fishing rod holder, whereby the fishing rod holder can be positioned at a desired angle relative to the surface by rotating the receiving member;
   (c) wherein a second opening is formed in the receiving member, a complimentary third opening is formed in the supporting section, and a fastening member is positioned through the second and third openings; and
   (d) wherein the third opening comprises a through hole, an inner surface of the second opening has threads formed thereon, and the fastening member comprises a bolt having threads thereon complimentary to the threaded inner surface of the second opening to frictionally engage the threaded inner surface of the second opening, whereby rotating the bolt in a first direction tightens the receiving member against the supporting section, and rotating the bolt in a second direction opposite to the first direction releases the receiving member from the supporting section, allowing the receiving member to rotate about the bolt.

6. The apparatus according to claim 5, wherein the receiving member can be selectively moved to one of a plurality of positions by rotating the bolt in the second direction to release the receiving member from the supporting section, rotating the receiving member about the bolt to a desired position, and tightening the bolt when the receiving member is at the desired position.

7. The apparatus according to claim 5, wherein the threads on the inner surface of the second opening comprise female threads, and the threads on the bolt comprise male threads.

8. The apparatus according to claim 5, wherein the receiving member is elongate, and the first opening is positioned at a substantially perpendicular orientation relative to the second opening.

9. The apparatus according to claim 8, wherein the receiving member has a substantially cuboid shape, the first opening is formed in a lateral side of the receiving member, and the second opening is formed in a longitudinal side.

10. The apparatus according to claim 5, wherein the receiving member has a substantially cuboid shape.

11. The apparatus according to claim 5, wherein the support member is L-shaped.

12. The apparatus according to claim 1, wherein the support member is L-shaped.

13. A fishing rod holder assembly comprising:
   (a) a holding member for receiving and holding a fishing rod; and
   (b) a support base comprising:
      (i) a substantially flat mounting section for positioning on a surface, and a supporting section angled in relation to the mounting section,
      (ii) a receiving member rotatably connected to the supporting section and having a first opening formed therein adapted for receiving and engaging a base end of the fishing rod holder, whereby the fishing rod holder can be positioned at a desired angle relative to the surface by rotating the receiving member;
      (iii) wherein a second opening is formed in the receiving member, a complimentary third opening is formed in the supporting section, and a fastening member is positioned through the second and third openings; and
      (iv) wherein the third opening comprises a through hole, an inner surface of the second opening has threads formed thereon, and the fastening member comprises a bolt having threads thereon complimentary to the threaded inner surface of the second opening to frictionally engage the threaded inner surface of the second opening, whereby rotating the bolt in a first direction tightens the receiving member against the supporting section, and rotating the bolt in a second direction opposite to the first direction releases the receiving member from the supporting section, allowing the receiving member to rotate about the bolt.

14. The assembly according to claim 13, wherein a plurality of openings are formed in the mounting section for receiving fastening members there through.

15. The assembly according to claim 13, wherein the support base is substantially L-shaped.

16. The assembly according to claim 13, wherein the holding member has a base end and threads formed on an outer surface of the base end, and further wherein an inner surface of the first opening in the receiving member has complimentary threads thereon for engaging the threads on the holding member base end, whereby the holding member is releasably connected to the receiving member.

17. The assembly according to claim 13, further comprising a nut positioned on the threaded base end of the holding member for selectively tightening engagement of the holding member in the first opening of the receiving member, whereby the holding member can be horizontally adjusted by rotating the base end the holding member within the opening to a desired position, and tightening the nut on the threaded base end.

18. The assembly according to claim 13, wherein the holding member comprises a cradle section for receiving and holding the fishing rod, and a stem section connected to the cradle section, the stem section having a threaded base end base, and further wherein an inner surface of the first opening in the receiving member has complimentary threads thereon for engaging the threads on the holding member base end, whereby the holding member is releasably connected to the receiving member.

19. The assembly according to claim 13, wherein the holding member can be selectively moved to one of a plurality of positions by rotating the bolt in the second direction to release the receiving member from the supporting section, rotating the receiving member about the bolt to a desired position, and tightening the bolt when the receiving member is at the desired position.

* * * * *